Dec. 5, 1933.  V. H. BODLE  1,937,807
COMPOSITE ARTICLE AND METHOD OF MAKING THE SAME
Filed Jan. 6, 1931
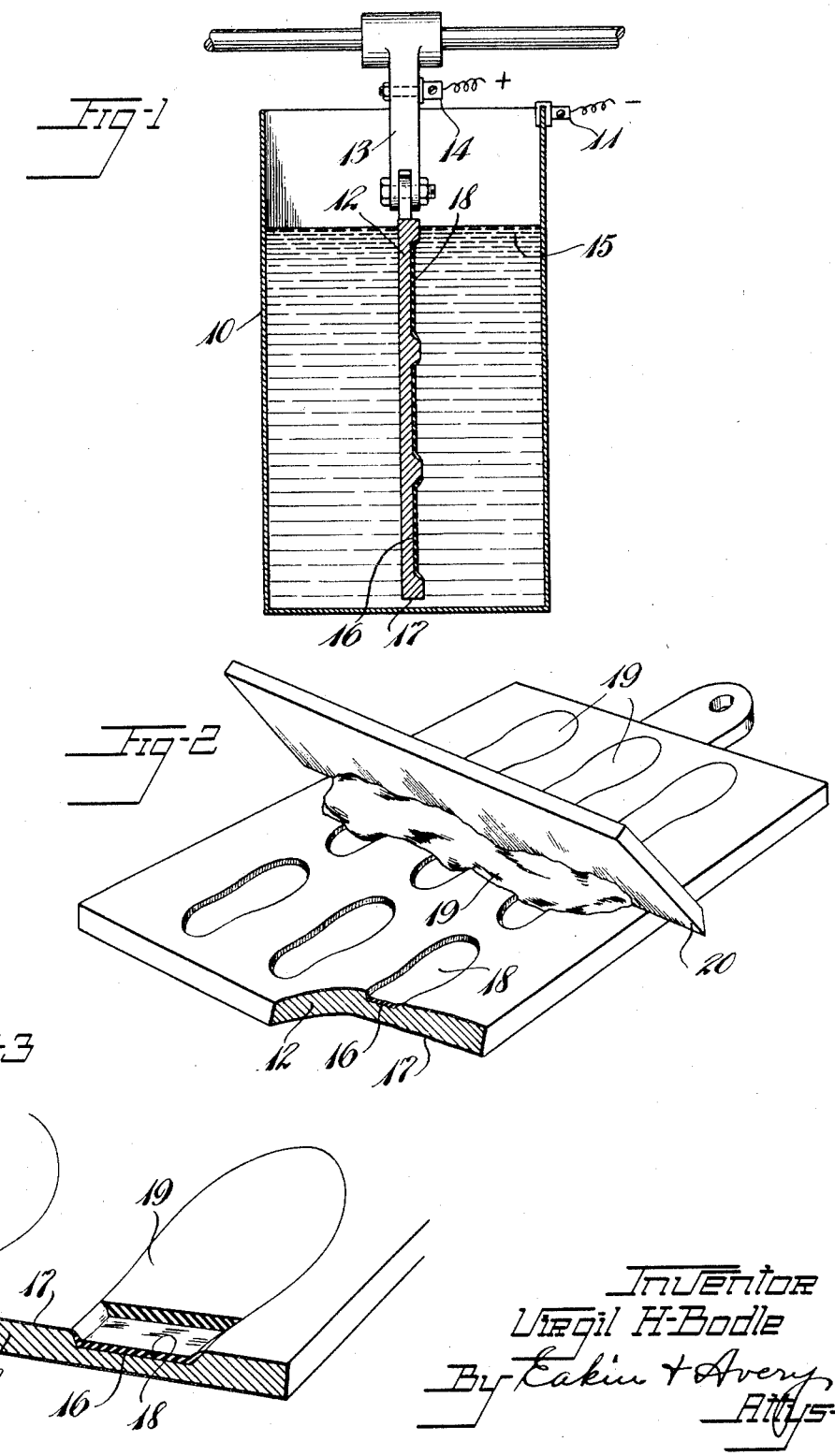

Patented Dec. 5, 1933

1,937,807

UNITED STATES PATENT OFFICE 1,937,807

COMPOSITE ARTICLE AND METHOD OF MAKING THE SAME

Virgil H. Bodle, Newton, Mass., assignor to The B. F. Goodrich Company, New York, N. Y., a corporation of New York Application January 6, 1931, Serial No. 506,857
Renewed March 22, 1933

8 Claims. (Cl. 18—59)

This invention relates to composite articles and to methods of making the same, and more especially to composite articles comprising two grades, colors, or kinds of rubber or rubber composition and to procedure for the manufacture thereof.

The invention is especially useful in the manufacture of rubber footwear, and is shown herein, for illustrative purposes, applied to the manufacture of composite rubber soles for footwear.

The chief objects of the invention are to provide an attractive rubber sole for footwear; to provide economy in the manufacture thereof; to avoid the production of composite scrap material in the manufacture of composite articles; and to provide an improved method for attaining the foregoing objects.

Of the accompanying drawing:

Fig. 1 is a vertical section through apparatus for electro-depositing rubber within the cavities of a mold, and the mold therein.

Fig. 2 is a perspective view of the mold after treatment in the apparatus shown in Fig. 1, showing means for filling the mold cavities with plastic composition, a part of the structure being broken away and in section.

Fig. 3 is a fragmentary sectional view of the mold and the work therein.

In Fig. 1 is shown a metal tank 10 serving as a cathode, connected to the negative terminal 11 of a suitable source of direct current. Within the tank is suspended the anode plate 12, supported by the hanger 13, which in turn is connected to the positive terminal 14 of the source of current. The tank 10 contains an aqueous dispersion of rubber 15, preferably a mildly alkaline natural rubber latex to which have been added dispersions of sulphur, accelerators, fillers, coloring matter, or such other additive ingredients as are required to confer the desired properties upon the deposited rubber. The plate 12 is preferably made of zinc or cadmium, but may consist of any metal which is capable of anodic solution without the generation of gas, and whose salts do not have an undesirable effect on the rubber.

As is more clearly indicated in Fig. 2, it contains cavities 16 engraved in one of its sides, the remainder of the surface of the metal being covered with a layer 17 of an insulating coating. The cavities are made of the size and shape of the finished rubber shoe sole.

When the electric current is passed from the positive terminal 14 through the hanger 13, the plate 12, and thence through the liquid 15 to the tank 10 and the negative terminal 11, it causes the negatively charged globules of rubber, together with the accompanying vulcanizing ingredients, etc., to migrate toward the anode plate 10 and be coagulated on the exposed surfaces thereof in the form of adherent deposits 18. No current passes through the insulated regions 17, hence the deposits are confined to the cavities 16. After the deposits 18 have acquired the desired thickness, less than the depth of the cavities 16, the current is interrupted, the plate 12 removed from the liquid 15 and the deposits 18 are dried.

The deposits 18, which cover the bottom and sides of the cavities 16, are to constitute the tread portion of the soles. However, they are made only a fraction of the total thickness of the sole, the remainder of the thickness being formed of a cheaper composition. Such a composition may consist of rubber, reclaimed rubber, fillers, vulcanizing agents, etc., brought to a smooth, plastic condition by a thorough mastication and the addition of softeners. Such a composition, represented as 19 in Fig. 2, is spread over the plate 12 by a doctor blade 20, which squeezes the composition into the cavities 16 on top of the deposits 18, filling the cavities completely, but scraping the surface of the plate clean.

The finished sole, as shown in Fig. 3, possesses a wear-resisting portion 18 of unmasticated latex rubber which possesses all the qualities of resilience and durability possessed by first latex crepe, but possesses the advantages over crepe soling of never having been masticated (a certain amount of mastication resulting in a loss of strength and resilience is unavoidable in the preparation and sheeting of crepe rubber) and of having vulcanizing ingredients mixed therewith so that it can be vulcanized without losing the advantageous properties of unmasticated latex rubber. At the same time the sole is rendered more solid and more economical to manufacture by incorporating the cheaper backing 19. This backing may, if desired, be made of a stiff, fibrous composition, which may be applied in the form of a concentrated paste of latex or other aqueous dispersion of rubber, reclaimed rubber, etc., which gels and solidifies upon drying.

The sole described above differs from previously known composite soles in that the tread composition is continued up the lateral edge so that the cheap backing composition is not exposed except on the upper surface which is to be covered by the shoe. Furthermore, the fact that each of the respective compositions employed is formed to shape in a single operation, and that the second composition is shaped while in contact with the first, instead of the sole being made by first sheeting and plying up the two compositions and then cutting out the soles with a die, insures an accurate juxtaposition of the various portions of the product, and eliminates entirely the composite scrap formerly produced. The result is that a superior, more durable product, with a better appearance, is produced more readily and economically than was heretofore possible.

The soles may be either partially or wholly vulcanized in place in the cavities of the plate 12, or they may be removed in the unvulcanized condition, cemented to unvulcanized rubber shoes, and vulcanized therewith.

It will be understood that the embodiment of the invention described above is illustrated only, and that the process is susceptible of numerous variations and modifications, and may be applied to the manufacture of many types of rubber articles other than the shoe soles specifically described. It is therefore not intended to limit the invention in any way except as may be required by the prior art and as indicated in the appended claims.

I claim:

1. A shoe sole comprising a tread portion of unmasticated, coagulated latex rubber extending over the entire width of the edge of the sole, and a backing stock of a plastic rubber composition.

2. A shoe sole comprising a tread portion of unmasticated electrodeposited latex rubber extending over the entire width of the edge of the sole, and a backing stock of a plastic rubber composition.

3. A shoe sole comprising a tread portion of unmasticated electrodeposited latex rubber extending over the entire width of the edge of the sole, and a backing stock of a plastic, masticated rubber composition.

4. A method of making a composite structure which comprises partially filling the cavities of an engraved plate with rubber by electrodeposition from an aqueous dispersion thereof, and filling the remainder of the cavities with a plastic rubber composition.

5. A method of making a composite structure which comprises partially filling the cavities of an engraved plate with unmasticated rubber by electrodeposition from a liquid latex composition, and filling the remainder of the cavities with a plastic, masticated rubber composition.

6. A method of making a composite structure which comprises partially filling the cavities of an engraved plate with unmasticated rubber by electrodeposition from a liquid latex composition, drying the deposited rubber, filling the remainder of the cavities with a plastic, masticated rubber composition, and vulcanizing the rubber.

7. The method of making a composite shoe sole which comprises electrodepositing unmasticated rubber from a liquid latex composition on the bottom and sides of a cavity having the size and shape of the finished sole in a metal plate, drying the deposited rubber, filling the remainder of the cavity with plastic, masticated rubber, and vulcanizing the rubber.

8. A method of making a composite structure, which comprises partially filling the cavities of an engraved plate with rubber derived directly from latex, and filling the remainder of the cavities with a plastic, masticated rubber composition.

VIRGIL H. BODLE.